(12) United States Patent
van Dongen

(10) Patent No.: US 11,337,406 B2
(45) Date of Patent: May 24, 2022

(54) RIGGING AND METHOD FOR RESCUING AN ANIMAL STUCK IN THE WATER

(71) Applicant: Cornelis Barthelomeus van Dongen, Schiedam (NL)

(72) Inventor: Cornelis Barthelomeus van Dongen, Schiedam (NL)

(*) Notice: Subject to any disclaimer, the term of this patent is extended or adjusted under 35 U.S.C. 154(b) by 862 days.

(21) Appl. No.: 15/998,767

(22) PCT Filed: Feb. 15, 2017

(86) PCT No.: PCT/NL2017/050087
§ 371 (c)(1),
(2) Date: Aug. 16, 2018

(87) PCT Pub. No.: WO2017/142400
PCT Pub. Date: Aug. 24, 2017

(65) Prior Publication Data
US 2019/0200575 A1    Jul. 4, 2019

(30) Foreign Application Priority Data
Feb. 16, 2016 (NL) .................... 2016274

(51) Int. Cl.
*A01K 27/00* (2006.01)
*A61D 3/00* (2006.01)

(52) U.S. Cl.
CPC ............ *A01K 27/002* (2013.01); *A61D 3/00* (2013.01)

(58) Field of Classification Search
CPC .... A01K 27/002; A01K 13/006; A01K 15/04; A01K 1/0272; A61D 9/00; A61D 3/00

USPC ......................... 119/856, 792, 815, 850, 857
See application file for complete search history.

(56) References Cited

U.S. PATENT DOCUMENTS

| | | | |
|---|---|---|---|
| 4,489,676 A * | 12/1984 | Colquist | A61D 9/00 119/815 |
| 5,329,884 A * | 7/1994 | Bell | A62B 35/0018 119/857 |
| 6,101,979 A | 8/2000 | Wilson et al. | |
| 6,216,636 B1 | 4/2001 | Butchko | |
| 6,612,265 B1 | 9/2003 | Birdsong | |
| 6,729,268 B1 | 5/2004 | Costell | |
| 6,971,476 B2 * | 12/2005 | Wolner | A62B 35/0031 119/770 |
| 2004/0045512 A1 * | 3/2004 | Goudal | A61D 9/00 119/850 |
| 2006/0048722 A1 * | 3/2006 | Elmberg | A47D 13/025 119/770 |

(Continued)

FOREIGN PATENT DOCUMENTS

DE         200771 C       7/1908
DE    202010014102 U1    1/2011

(Continued)

*Primary Examiner* — Yvonne R Abbott-Lewis
(74) *Attorney, Agent, or Firm* — Hoffmann & Baron, LLP

(57) ABSTRACT

Rigging for pulling an animal stuck in the water, such as a horse or cow, includes at least one elongated abdominal portion which is adapted for placement along a ventral side of the animal behind at least one foreleg of the animal; and a back portion which is adapted for placement along a dorsal side of the animal, where the abdominal portion includes at least one bending-stiff insert element, so that the abdominal portion can be inserted with an inserting motion behind at least one foreleg of the animal.

15 Claims, 9 Drawing Sheets

(56) References Cited

U.S. PATENT DOCUMENTS

| | | | |
|---|---|---|---|
| 2006/0102102 A1* | 5/2006 | Bennett | A01K 27/005 119/792 |
| 2006/0288959 A1* | 12/2006 | Schantz | A01K 27/002 119/792 |
| 2009/0314224 A1 | 12/2009 | Rubinstein et al. | |
| 2012/0318211 A1* | 12/2012 | Madonna | A01K 27/002 119/792 |
| 2013/0239906 A1 | 9/2013 | Webb | |

FOREIGN PATENT DOCUMENTS

| | | |
|---|---|---|
| GB | 2184091 A | 6/1987 |
| WO | 96/28017 A1 | 9/1996 |

* cited by examiner

RIGGING AND METHOD FOR RESCUING AN ANIMAL STUCK IN THE WATER

CROSS-REFERENCE TO RELATED APPLICATIONS

This application is the National Stage of International Application No. PCT/NL2017/050087, filed Feb. 15, 2017, which claims the benefit of Netherlands Application No. NL 2016274, filed Feb. 16, 2016, the contents of which is incorporated by reference herein.

FIELD OF THE INVENTION

The present invention deals with a rigging for pulling an animal, such as a horse or cow, which is particularly suitable to being used in rescuing an animal stuck in the water. With the help of the rigging, the animal can be pulled in the forward direction. The rigging comprises at least one elongated abdominal portion which is adapted for placement along a ventral side of the animal behind at least one foreleg of the animal. Moreover, the rigging comprises a back portion which is adapted for placement along a dorsal side of the animal. A pulling line can be affixed to the rigging in order to pull the animal out.

Moreover, the invention deals with a method for placement of a rigging for pulling an animal. In particular, the invention deals with a method for rescuing an animal stuck in the water.

BACKGROUND OF THE INVENTION

It is known from practical experience how to pull a horse or a cow stuck in the water with a fire hose out of the water. In this case, the fire hose is wrapped around the animal. By pulling on the two ends of the fire hose, the animal can be helped onto the bank.

Moreover, a number of riggings are known in the prior art for rescuing a horse or a cow from the water.

A known rigging, the so-called horse pants, which can be purchased from the firm Hobrand Algebra, is constructed from a mat-like abdominal portion formed by a piece of tarpaulin and a mat-like tail portion. The mat-like abdominal portion should be placed under the abdomen of an animal and then be secured on the back of the animal—the dorsal side, back side—by closing a strap. In this way, the abdominal portion forms a whole with the back portion. The mat-like tail portion is then placed on the caudal side of the animal and coupled to a rear portion of the mat-like abdominal portion. A pulling cable can be fastened to a forward portion of the mat-like abdominal portion to exert a pulling force. With the horse pants, an animal can be pulled or hoisted up out of the water.

Moreover, a rigging is known from Häst PSC under the name Large Animal Rescue Equipment. This rigging is constructed from a saddle strap, abdominal strap and chest strap. The saddle strap is elongated and has two ends. The saddle strap needs to be placed across the back—the dorsal side—of an animal. The abdominal strap needs to be placed underneath the abdomen of an animal—so across the ventral side, the abdominal side—and is then connected to the ends of the saddle strap. After this, the chest strap is coupled to the ends of the saddle strap, so that the chest strap extends across the chest of the animal—at the cranial side. The saddle strap and the chest strap are provided with floats, so that an animal stuck in the water is supported.

A problem with the known riggings is that they are hard to put on when an animal is stuck in the water. The animal stuck in the water is generally hard to approach from the bank or through the water. The bank is often slick and the bottom of the water is swampy. Furthermore, the animal is often stressed, which makes it extra hard to apply the rigging.

SUMMARY OF THE INVENTION

The present invention thus has the purpose of remedying at least in part at least one of the aforementioned drawbacks, or to provide a useful alternative. In particular, the purpose of the invention is to provide a rigging and method for rescuing an animal, wherein the rigging can be applied relatively easily.

This purpose is achieved with a rigging according to the present invention.

According to the invention, a rigging is provided for pulling an animal, such as a horse or cow. The rigging is in particular a farming aid. The rigging is suitable for rescuing an animal from a situation of distress. Specifically, the rigging is suitable for rescuing an animal stuck in the water. The rigging comprises at least one elongated abdominal portion which is adapted for placing along a ventral side—abdominal side—of the animal behind at least one foreleg of the animal. Further, the rigging comprises a back portion which is adapted for placement along a dorsal side—back side—of the animal.

The rigging according to the invention is characterized in that the abdominal portion comprises at least one bending-stiff insert element, so that the abdominal portion can be inserted with an inserting motion behind at least one foreleg of the animal.

The insert element of the abdominal portion is bending-stiff. Bending-stiff means here that the insert element has a stiffness in a direction transverse to the lengthwise direction of the insert element. Bending-stiff means here that the insert element is stiff along the length of the insert element, rather than being slack and shapeless. The abdominal portion in the form of a band as with the aforementioned rigging of Häst is, for example, slack and shapeless. Such a band or textile strip has an arbitrary shape, for example, rolled up or stretched out, and is not bending-stiff and therefore cannot function as an insert element.

According to the invention, the insert element can be grasped by a user at a proximal end, while the distal end is moved away from the user in order to produce an inserting movement. The elongated abdominal portion is inserted by an inserting movement behind the at least one foreleg of the animal. The inserting movement can take place from a front side (the chest of the animal) or from a side flank of the animal.

Behind at least one foreleg means that the abdominal portion can be inserted behind a single one or both of the forelegs. Behind means that the abdominal portion is positioned at least partially behind the foreleg, where the head of an animal determines the front side and the tail of the animal determines the rear side.

By pulling an animal according to the invention is meant in particular the forward pulling of an animal in the forward walking direction. A pulling line, such as a braided rope, steel cable or chain with links can be coupled to the rigging and used to pull the animal.

The rigging according to the invention can provide various benefits.

Because the insert element is bending-stiff, the insert element and with it the abdominal portion can be inserted in a controlled manner behind one or both of the forelegs of an animal.

The bending-stiff insert element of the abdominal portion can make the placement of the rigging considerably easier. The animal to be pulled, which may find itself in a ditch, can be approached and the abdominal portion can be inserted by a user behind a single foreleg or underneath the abdomen of an animal behind both forelegs from a position in front of or alongside the animal, for example, at the brink of the ditch. Because the abdominal portion comprises an insert element which is bending-stiff, the user can grasp the elongated abdominal portion at a proximal end during the inserting process and simply guide the free distal end of the abdominal portion and insert and pull it through in the correct position. The user can guide the abdominal portion in a controlled manner with the bending-stiff insert element in order to place the abdominal portion behind at least one foreleg.

In one embodiment of the rigging according to the invention, the bending-stiff insert element is made of a plastic material. Preferably, the insert element is made of a plastic strip material. As compared to an insert element made of metal, corners or edges of an insert element made of plastic material can be rounded off or bevelled, so that sharp points or edges can be avoided.

In one embodiment of the rigging according to the invention, the abdominal portion and the back portion are in the shape of bands. Preferably the back portion is a back strap.

In one embodiment of the rigging according to the invention, the abdominal portion and the insert element are formed into a single unit. The insert element is preferably integrated in the abdominal portion such that the abdominal portion and insert element form a single piece.

In one embodiment of the rigging according to the invention, the abdominal portion comprises a textile strip, wherein the strip has at least one seam, wherein at least one bending-stiff insert element, for example in the form of a flat metal strip, is received in one seam or several seams. Advantageously, the textile strip forms a lining for the at least one insert element, which contributes to the comfort of the rigging.

In one embodiment of the rigging according to the invention, the abdominal portion comprises several parallel arranged bending-stiff insert elements. The insert element can be rod-shaped with a round cross section, for example. The abdominal portion can comprise several rod-shaped insert elements positioned parallel with each other, or the abdominal portion can comprise a bundle of insert elements in the form of strands, for example.

In one embodiment of the rigging according to the invention, the insert element can be a separate item which can be detached from the abdominal portion and back portion. The insert element can be used as an accessory tool for guiding the abdominal portion along a ventral side of the animal behind at least one foreleg. A distal end of the abdominal portion or of a combination of the abdominal portion and back portion can be connected to a distal end of the insert element. After putting the rigging in place, the insert element can optionally be removed from the rigging.

In one embodiment of the rigging according to the invention, the at least one insert element has a predetermined arched shape which is adapted to insert the insert element behind a single foreleg or both forelegs. The predetermined arched shape of the insert element involves a bending shape produced during the fabrication of the insert element. The insert element is so bending-stiff that the bending shape remains on its own. Thanks to the predetermined bending shape, the guiding of the insert element is easier when putting the abdominal portion in place.

In one embodiment of the rigging according to the invention, the rigging comprises one abdominal portion with a bending-stiff insert element, wherein the insert element is adapted for the placement of the abdominal portion along a ventral side of the animal behind both forelegs. Advantageously, the insert element can be inserted from a left or right side of the animal underneath the ventral side. In this case, the bending shape of the insert element can be adapted to the curvature of the ventral side of the animal, so that during the inserting process a distal end of the insert element can easily follow the curvature of the ventral side of the animal. The bending shape has, for example, a radius of at least 30 cm, especially at least 50 cm. The bending shape of the insert element can facilitate the closure of the assemblage of abdominal portion and back portion around the abdomen and back of the animal during use.

In one embodiment of the rigging according to the invention, the elongated insert element has a length of at least 100 cm. Thus, the insert element has sufficient length for the insert element to be inserted underneath a ventral side and behind both forelegs, wherein both ends of the insert element remain reachable in order to close the rigging.

In one embodiment of the rigging according to the invention, the abdominal portion and the back portion are integrated with each other into an assemblage. The abdominal portion and back portion together form a single unit. The unit when in use forms an elongated piece. The assemblage has a first and second end which can be joined to each other by means of a back portion lock. Preferably the back portion lock is designed as a quick lock. The back portion lock is situated centrally on the back of the animal during use. The back portion lock is positioned on top of the back of the animal. The advantage of the back portion lock is that the assemblage can easily drop off from the animal after the opening of the back portion lock. In this way, the rigging can be easily removed from the animal. Preferably, the back portion lock comprises an electronic release with a remote control for releasing the back portion lock from a distance. This has the advantage that a user can open the back portion lock at a distance and does not have to come near an animal which might be under stress. This greatly improves the safety during use of the rigging for man and animal.

In one embodiment of the rigging according to the invention, the assemblage of back portion and abdominal portion comprises several coupling points for the fastening of a pulling line. A coupling point is preferably designed as a pulling eyelet. After the fastening of a pulling line, the animal can be pulled forward and/or upward in order to rescue the animal from a situation of distress. An animal stuck in the water can be pulled onto the bank or hoisted up. A situation of distress can involve many kinds of situations, such as a situation in which an animal is stuck in a cattle grid in a stable.

In one embodiment of the rigging according to the invention, the rigging comprises two abdominal portions each with a bending-stiff insert element. The rigging has two separate insert elements. Separate means that the two insert elements can be separate from each other and be operated separately by a user. Separate means that the two insert elements involve components of the rigging which are movable relative to each other. The two insert elements form components of the rigging which are functionally independent of each other. The two insert elements can be inserted separately of each other. The two insert elements can be inserted one after the other when putting the rigging in place. A first insert element is adapted to be arranged along a ventral side of the animal behind a left foreleg. A second insert element is adapted to be arranged along a ventral side of the animal behind a right foreleg. Advantageously, each insert element can be inserted from a cranial side of the animal between the forelegs and behind one of the forelegs. In this case, the bending shape of each insert element is adapted to an imaginary path around a foreleg, so that during the inserting a distal end of the insert element can easily follow the imaginary path around the foreleg. The bending shape has for example a radius of at least 15 cm, in particular at least 25 cm. The bending shape of each insert element can facilitate the closure of the rigging during use.

In one embodiment of the rigging according to the invention, the elongated insert element has a length of at least 50 cm. Thus, the insert element has sufficient length for placement of the insert element around a foreleg.

In one embodiment of the rigging according to the invention, the rigging moreover comprises a pulling line. The pulling line is for example a rope, cable, or chain. The pulling line is connected or can be connected to the rigging, in particular to the assemblage of abdominal portion and back portion. Preferably, the rigging according to the invention makes up a package, wherein the pulling line and the rigging are both part of the package.

Advantageously, the rigging in this embodiment is ready for use. The package can moreover contain a manual with instructions for use of the rigging when pulling an animal, especially for the rescuing of an animal such as a cow or horse stuck in the water.

In one embodiment of the rigging according to the invention, the rigging moreover comprises a neck strap. The neck strap is adapted to be placed around a neck of the animal. The neck strap can have a length adjustment in order to fit the neck strap to a particular neck circumference of a given animal. The neck strap has a neck strap lock for the closing of the neck strap around the neck. Preferably, the neck strap lock is a quick neck strap lock. A pulling force exerted of 20 kN, for example, can be distributed over both the neck strap and the assemblage of abdominal portion and back portion. By the distribution of the pulling force over the rigging, the pulling forces are distributed over the neck and chest of the animal. Advantageously, this can spare the throat, larynx and cervical vertebrae of the animal at least partly.

The neck strap lock is moreover preferably designed for a coupling of the neck strap to the assemblage of the abdominal portion and the back portion. In this way, the rigging can be locked in a single position, preferably on the back of the animal.

In one embodiment of the rigging according to the invention, the neck strap comprises in a lower region a coupling point for the coupling of a pulling line, such as a rope, chain, or cable. During use, the coupling point is positioned in this way in front of the chest, beneath the head of an animal. Advantageously, pulling forces can then be transferred onto the animal, so that cervical vertebrae can be spared.

In one embodiment of the rigging according to the invention, the rigging comprises at least one pulling strap, preferably a left and a right pulling strap. At least one section of the at least one pulling strap is positioned or can be placed between the neck strap and the assemblage of back portion and abdominal portion. Advantageously, the at least one pulling strap can contribute to a uniform distribution of the pulling force over the rigging. A pulling force can be applied to the neck strap and then be effectively guided via the left and right pulling strap to the assemblage of back portion and abdominal portion.

In one embodiment of the rigging according to the invention, the at least one pulling strap can have a distal end with a coupling point, such as a textile loop or a metal eye, for the fastening of a pulling line. The distal end of the pulling strap is positioned from the assemblage of abdominal portion and back portion. Advantageously, in this way a force can be applied along the lengthwise direction of the pulling strap when a pulling force is exerted.

In one embodiment of the rigging according to the invention, the proximal end of the pulling strap can be connected in various positions to the assemblage of abdominal portion and back portion. For this, the assemblage is provided with several fastening elements. Preferably, the assemblage has several fastening elements which are provided in various positions one above the other in the lengthwise direction for the connecting of the proximal end of the pulling strap to the assemblage. Preferably, several fastening holes are provided on the abdominal portion, so that the pulling strap can be secured in various positions to the abdominal portion. In this way, the rigging can be advantageously adjusted to different sizes of animals, such as calves, bulls, or horses.

In one embodiment of the rigging according to the invention, the abdominal portion has two separate insert elements, i.e., a left and a right insert element. A first insert element is designed to be placed along a ventral side of the animal behind a left foreleg. A second insert element is designed to be placed along a ventral side of the animal behind a right foreleg. The left and right insert elements each have a proximal and a distal end. The proximal ends of the left and right insert elements are firmly connected to the neck strap. In particular, the proximal ends are connected in a low-lying region to the neck strap, so that the proximal ends are located in front of the chest of the animal when placing the neck strap around the neck of the animal. The distal ends of the left and right insert elements can be coupled to the rigging. When the rigging is put in place, the rigging has an open condition, wherein the distal ends of the left and right insert elements are loose. After the inserting of the left and right insert elements around the forelegs of the animal, the distal ends can be coupled to the rigging. In this way, the rigging is placed in a closed condition.

In one embodiment of the rigging according to the invention, the abdominal portion and the back portion are integrated with each other to form a single component. The component is elongated and has a first and a second end which can be coupled to each other by means of a back portion lock which is designed in particular as a quick lock. The quick lock can comprise a snap connection. When placing the component on an animal, the first end can be grasped by a user and the second end can be inserted and guided along the ventral side of the animal. After this, first and second ends can be brought together at the dorsal side of the animal and coupled together there.

In one embodiment of the rigging according to the invention, the back portion lock for the closing of the assemblage of abdominal portion and back portion and the neck lock for the closing of the neck strap are integrated together to form a head lock of the rigging. The head lock is a unit, by which both the neck strap and the assemblage of abdominal portion and back portion can be opened and closed. The head lock as a single unit is advantageous because the closing of the rigging can occur in a single position. Preferably, the head lock during use is positioned on the dorsal side of the animal.

Further preferably, the position of the head lock during use lies just behind the head in the middle of the back of the animal.

In one embodiment of the rigging according to the invention, the head lock comprises an electronic release with a remote control for releasing the head lock from a distance. By the opening of the head lock, the rigging can be removed from the animal. The electronic release is advantageous because the removal of the rigging can be done in a safe manner. After pulling an animal out of the water, the animal is often stressed, which may lead to dangerous situations if people come close to the animal. As long as the animal is still firmly fastened to the pulling line, the freedom of movement of the animal is limited, so that the animal can become further stressed. Advantageously, the electronic release makes it possible for the user to remove the rigging from the animal from a safe distance, so that the animal is released and can quiet down.

Furthermore, the invention concerns a method for the applying of a rigging for pulling an animal, especially for the rescuing of an animal from a situation of distress, especially the pulling out of an animal stuck in the water. With the help of the rigging, the animal can be pulled forwards and/or hoisted up. In particular, the rigging is a farming implement for the carrying out of a farming method. The animal is in particular a livestock, especially a large livestock animal kept in a meadow, such as a cow or horse.

The method according to the invention involves a number of steps. In one step, a rigging according to the invention is provided in a loosely coupled condition. An elongated insert element of an abdominal portion of the rigging has at least one loosely coupled distal end. In one step, the animal that needs to be pulled has to be approached. In one step, the distal end of the insert element is inserted behind at least one foreleg of the animal. After this, the rigging is closed. The at least one distal end of the abdominal portion is coupled to a back portion or neck strap or pulling strap of the rigging.

In one embodiment of the method according to the invention, the rigging can comprise a single elongated insert element which is inserted in one step behind both forelegs of the animal. Preferably the elongated insert element has a first and second loosely coupled end during the inserting, which after the inserting behind the forelegs are joined together on the back of the animal.

In one embodiment of the method according to the invention, the rigging can comprise 2 elongated insert elements which are each inserted behind a left and right foreleg of the animal, respectively.

Further preferred embodiments are described herein.

BRIEF DESCRIPTION OF THE DRAWINGS

The invention shall be further explained with the aid of the enclosed drawings. The drawings constitute a practical embodiment of the invention, which should not be viewed in a limiting sense. Specific detail features can also be seen as characteristic of the invention in a general sense, apart from the sample embodiment, wherein.

DETAILED DESCRIPTION OF THE INVENTION

In the figures, the same reference numbers are used to indicate corresponding parts. In order to facilitate the understanding of the specification and the claims, the words "vertical, horizontal, longitudinal, transverse, central" are used with reference to the force of gravity, which should be interpreted in a technically functional manner and not limiting to the scope of the patent protection.

Figure 1A:
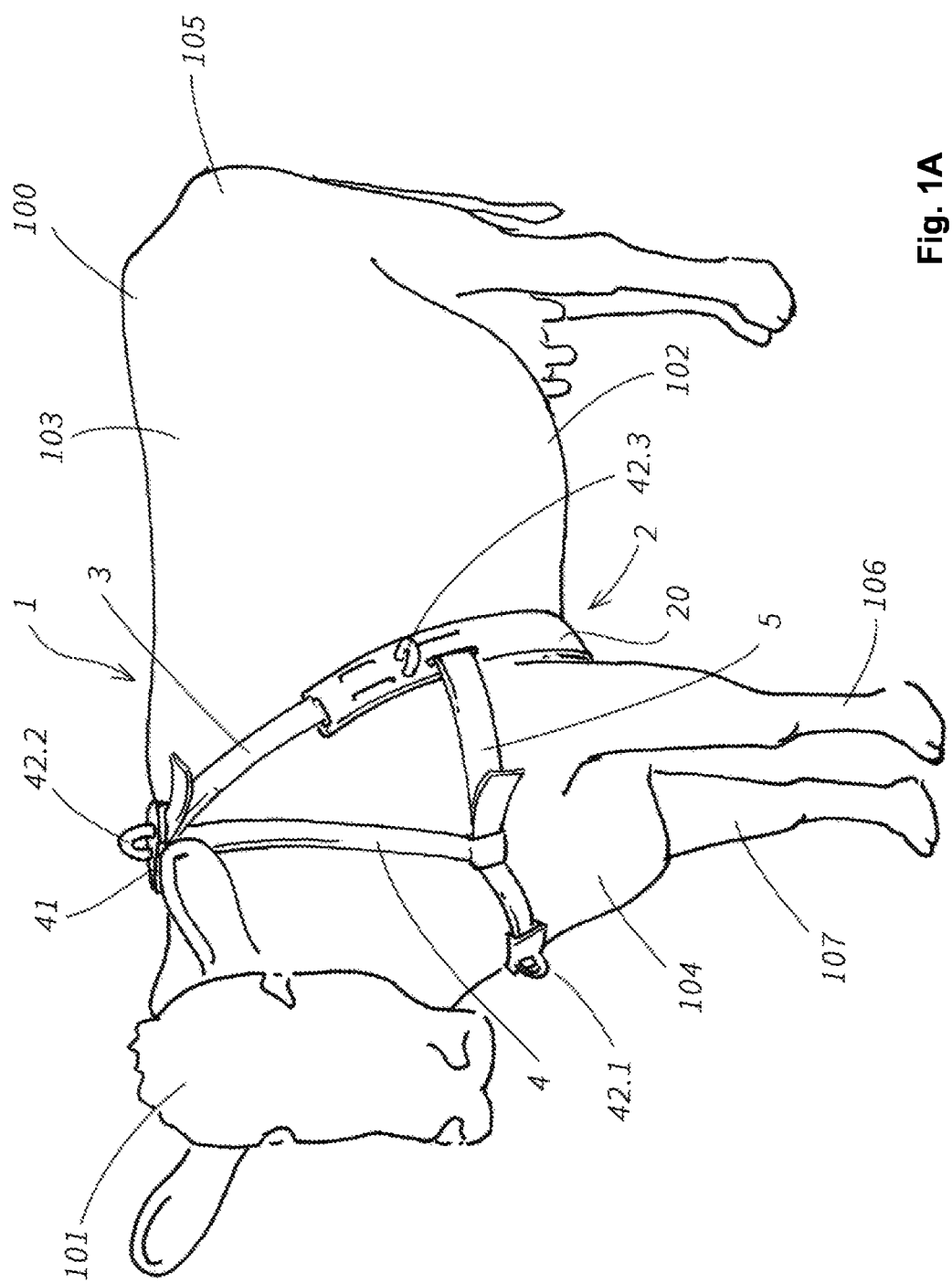
FIG. 1A in a perspective view shows an animal with a rigging according to the invention, wherein an abdominal portion of the rigging has been placed beneath a ventral side of the animal.

FIG. 1A shows in a perspective view an animal 100 with a rigging 1 according to the invention. The animal is an animal weighing more than 100 kg, especially more than 300 kg, such as a cow or horse. The rigging 1 is adapted for the pulling of the animal. A rope can be attached to the rigging 1 in order to pull the animal in the forward direction. The rigging 1 is adapted in particular for the rescuing of animals stuck in the water. The rigging 1 can be arranged on an animal stuck in the water, after which the animal can be pulled out of the water.

The rigging 1 is arranged behind the head 101 of the animal. The rigging 1 comprises an elongated abdominal portion 2. The abdominal portion 2 extends along the ventral side 102 of the animal. The abdominal portion 2 is positioned behind the forelegs 106, 107 of the animal.

Moreover, the rigging 1 comprises an elongated back portion 3. The back portion 3 together with the abdominal portion 2 forms an assemblage. The back portion 3 is elongated and extends for the length of the abdominal portion 2. The back portion 3 extends along the dorsal side 103 of the animal. The back portion 3 is positioned near the neck of the animal.

The abdominal portion 2 and the back portion 3 are integrated with each other into an assemblage. The assemblage has a first end and a second end which can be coupled to each other by means of a back portion lock 31. By the closure of the back portion lock 31, the assemblage of back portion 3 and abdominal portion 2 can be secured around the trunk of an animal. The back portion lock 31 is positioned in a centrally situated region of the back portion 3. With the aid of the back portion lock 31, a left section can be coupled manually to a right section of the back portion 3.

Figure 1B:
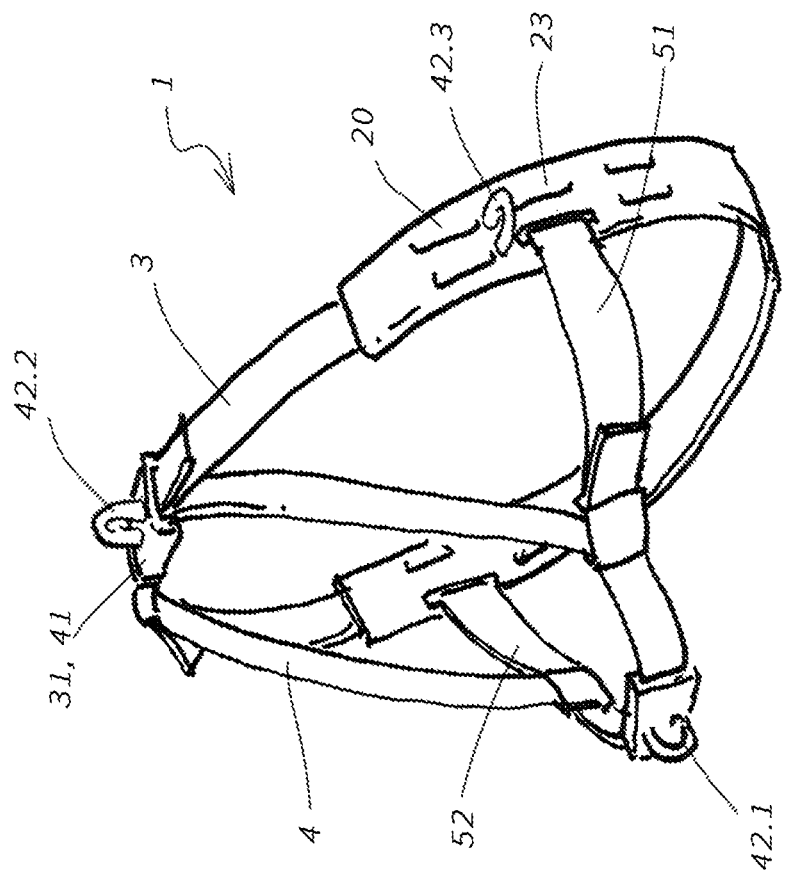
FIG. 1B shows the rigging of FIG. 1 A, wherein the abdominal portion comprises a single insert element.

As illustrated in FIG. 1A and more closely in FIG. 1B, the rigging 1 according to the invention comprises a bending-stiff insert element 20. The insert element 20 is bending-stiff in design, which means that the elongated insert element is bending-stiff along its length, so that the elongated abdominal portion 2 can be placed by a user with an inserting motion underneath the ventral side of the animal. The assemblage is loosely coupled for the inserting of the assemblage of abdominal portion and back portion. The insert element 20 can be grasped by the user at a first end, while an oppositely situated free second end can be inserted along the ventral side. The bending-stiff insert element 20 facilitates the placement of the abdominal portion 2 so that the abdominal portion after the inserting motion extends across the ventral side from the left side to the right side of the animal. After this, the user can couple the first end to the second end of the assemblage by closing the back portion lock 31. With this, the abdominal portion 2 and the back portion 3 have been placed around the body of the animal.

The dimensioning of the insert element 20 corresponds to the size of the animal. The length of the insert element 20 has a dimension of at least 100 cm, especially at least 150 cm, so that a free end of the insert element 20 can be inserted from a first flank side to an opposite second flank side of an animal. Advantageously, the two ends of the assemblage of abdominal portion 2 and back portion 3 can be easily reached by the user after the inserting process, so that the rigging 1 can be put in place relatively easily.

As shown in FIG. 1B, the insert element 20 has a predetermined bending shape. The bending shape is favourable to the inserting, because the free end of the insert element 20 can be guided into an upper situated position. In this way, the free end can be positioned above water, for example, and the free end can be easily reached in order to close the rigging 1 around the body of the animal in a following step.

The assemblage of abdominal portion 2 and back portion 3 without further straps connected to it forms a first embodiment of the rigging according to the invention. A first and/or second pulling line can be connected to the assemblage on either side of the animal in order to then apply a pulling force.

In the embodiment shown, the rigging 1 moreover comprises a neck strap 4 which is connected to the assemblage of abdominal portion 2 and back portion 3. The neck strap 4 has a neck strap lock 41. The neck strap lock 41 here coincides with the back portion lock 31 and thereby forms a head lock of the rigging 1. The head lock of the rigging 1 embodies both the back portion lock 31 and the neck strap lock 41. By the opening and closing of the head lock, the rigging 1 can be opened and closed respectively by a user in a single position. Preferably, the head-lock 41 is positioned (as illustrated) on the dorsal side of the animal. The head lock 41 is positioned on the back at the bottom of the neck of the animal 100. This position of the head lock 41 is advantageous, because when the head lock 41 is opened the rigging 1 itself comes loose from the animal under the force of gravity. A possibly stressed animal just rescued from the water can be quickly freed up from the rigging in this way. The animal will therefore calm down more quickly. A major advantage to the user is that the removal of the rigging 1 can occur quickly and conveniently.

In one embodiment, the head lock 41 can comprise an electronic release. The electronic release is provided with a remote control for the releasing of the head lock from a distance. After rescuing the animal from the water, the user can employ the remote control to release the head lock so that the rigging 1 drops off from the animal under the influence of gravity. The electronic release with remote control contributes to a safe method, since the user can remain at a distance from the animal when removing the rigging. In this way, accidents which still occur in routine practice when letting loose a stressed animal can be advantageously prevented.

As is shown in FIG. 1B, the head lock 41 has a first lock piece and a second lock piece which can be coupled to each other. To the first lock piece is connected a left section of the strap-like back portion 3 and a left section of the neck strap 4. To the second lock piece is connected a right section of the strap-like back portion 3 and a right section of the neck strap 4.

The lock pieces are provided with a length adjustment. The sections of the straps which are connected to the lock pieces are thereby adjustable in length, so that the assemblage of back portion 3 and abdominal portion 2 and the neck strap 4 can be pulled tight by a user. The tightening of the straps has the benefit that a pulling force exerted by a user will be uniformly distributed over the body of the animal.

Moreover, the rigging 1 comprises at least coupling point 42, here, coupling points 42.1, 42.2, 42.3 for the fastening of a pulling line. The coupling point 42.1 is a chest coupling point and is positioned in a lower situated region, in the middle, of the neck strap 4. Thanks to the central positioning of the coupling point 42.1, the animal can be pulled out advantageously with only a single pulling line. The coupling point 42.2 is a neck coupling point and is positioned on the neck of the animal. The neck coupling point 42.2 is positioned in a centrally situated region of the back portion 3. The coupling point 42.3 is a flank coupling point and is positioned on a flank of the animal. The rigging is provided with a flank coupling point 42.3 both left and right. With the aid of the one or more coupling points the animal can be pulled forward and/or upward.

As shown in FIG. 1B, the neck strap 4 is connected to the assemblage of abdominal portion 2 and back portion 3 by means of a left and right pulling strap 51, 52. The pulling straps 5 are adjustable in length. The pulling straps 51, 52 are connected to a lower region of the neck strap 4. A proximal end of the pulling strap is connected to the neck strap 4 and is positioned close to the coupling point 42.1, so that when a pulling force is exerted (which can be, for example, 20 kN) the pulling line is lined up with the coupling point 42.1 and the pulling strap 5 in the lower region of the neck strap 4, as shown in FIG. 1A. In particular, the proximal end of the pulling strap is positioned with respect to the coupling point 42.1 at a distance of around a quarter of the length of the section of the neck strap between the coupling point 42.1 and the head lock 41, so that a good alignment is achieved for the exerting of the pulling force.

As is shown in FIG. 1B, the insert element 20 of the abdominal portion 2 is provided with at least one fastening element 23 for the fastening of the pulling strap 5 to the abdominal portion 2. The fastening element 23 here is configured as an eye in the insert element, through which the pulling strap 5 can be led. The fastening element 23 likewise has a length adjustment for a pulling strap 5 led through it.

Advantageously, the rigging 1 is freely adjustable and the rigging 1 can be used for both small and large animals stuck in the water, such as sheep, calves, cows, ponies and horses.

Figure 2A:
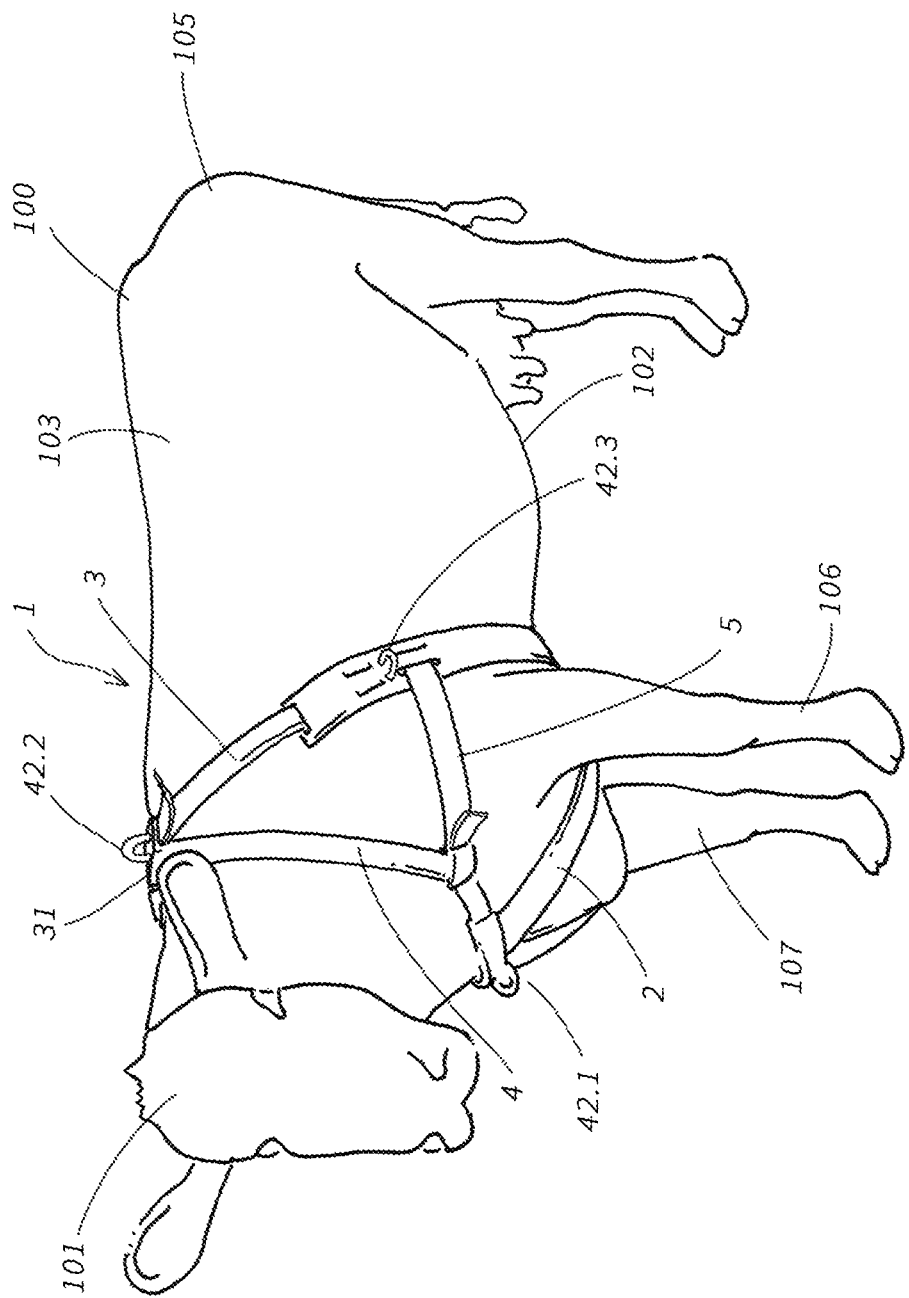
FIG. 2A in a perspective view shows an animal with another embodiment of a rigging according to the invention, wherein a separate abdominal portion with insert element is placed behind each foreleg.
Figure 2B:
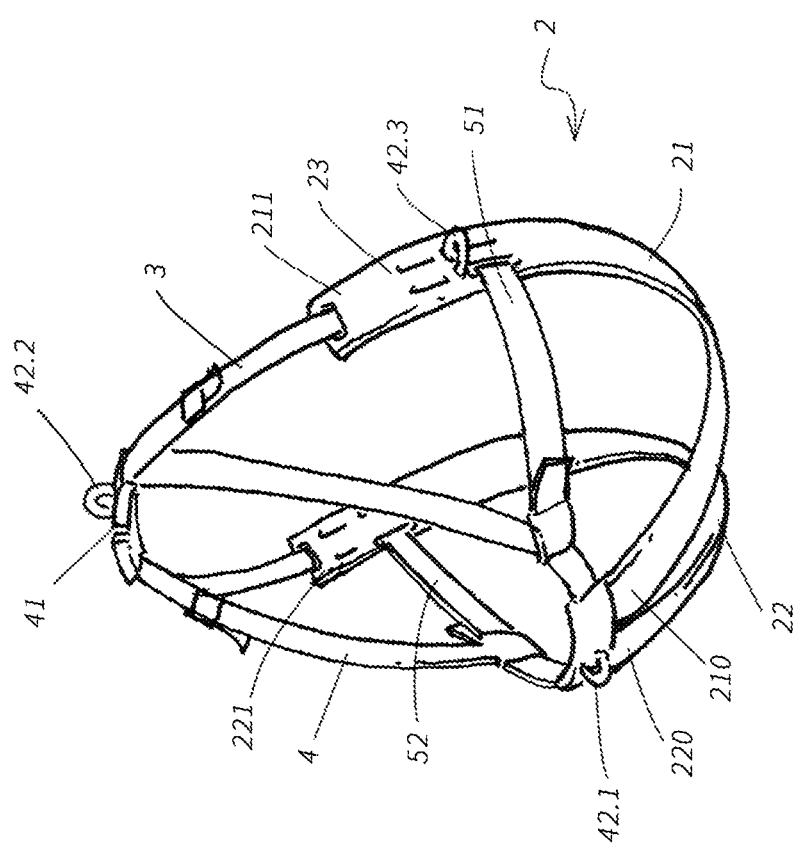
FIG. 2B shows the rigging of FIG. 2A, wherein the rigging has an abdominal portion with a first and second insert element.

FIG. 2A and FIG. 2B show an alternative embodiment of the rigging 1, in which the abdominal portion 2 comprises a separate first and second insert element 21, 22. The first insert element 21 is adapted to be placed behind a first foreleg of the animal 100. The second insert element 22 is adapted to be placed behind a second foreleg of the animal 100.

Each insert element has a proximal end 210, 220 and a distal end 211, 221. The proximal end 210, 220 of each insert element is firmly attached to the neck strap 4 in the area of the coupling point 42.1. The distal end 211, 221 of each insert element is connected respectively to a left or right section of the back portion 3.

The rigging 1 can be arranged by first closing the neck strap 4 around the neck of the animal 100. Next, the insert elements 21, 22 can be arranged by an inserting movement. Each insert element 21, 22 can be inserted from a front side of the animal behind each of the forelegs 106, 107. Preferably, the left and right pulling straps 51, 52 are connected detachably to the neck strap 4, for example, to the lower piece forming the coupling point 42.1, so that these pulling straps 51, 52 can be closed after the abdominal portion 2 with the two insert elements 21, 22 has been arranged.

The insert elements 21, 22 of the abdominal portion 2 are dimensioned in accordance with the corresponding dimensions of the animal. The insert elements have a length of at least 50 cm. In order to insert the insert elements 21, 22 easily behind the forelegs, the insert elements preferably have a bending shape. Preferably, the insert elements have a predetermined bending shape with a radius of at least 15 cm, especially at least 30 cm. Thus, the insert element 21, 22 is able to be moved from a position at the cranial side by an inserting motion behind a foreleg, wherein the distal end 211, 221 of the insert element can be guided to a flank side and upward, after which the distal end of the insert element can be secured.

FIG. 3A-E shows in a schematic representation various steps of the method for the placement of the rigging 1, such as the rigging shown in FIG. 1B.

Figure 3A:
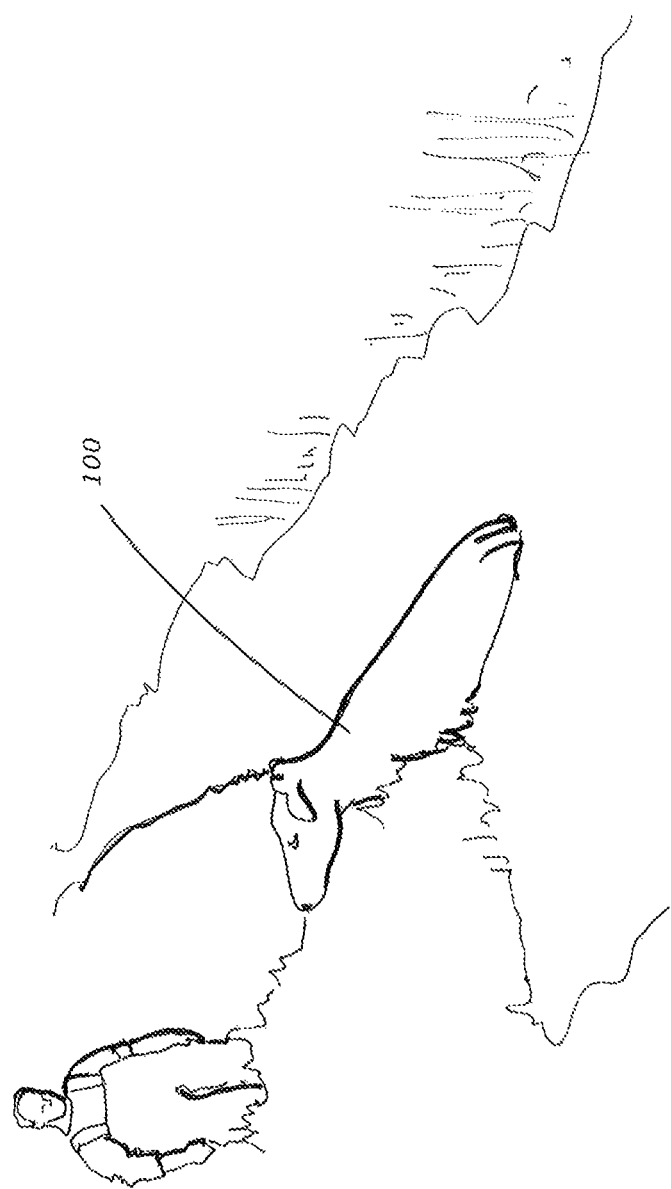
FIG. 3A-3E provides a schematic overview of steps of a method for placing the rigging according to the invention.

FIG. 3A shows an animal 100 stuck in the water. The animal, here a cow, has landed in a ditch from a bank. A person is approaching the animal in order to rescue it from the water.

Figure 3B:
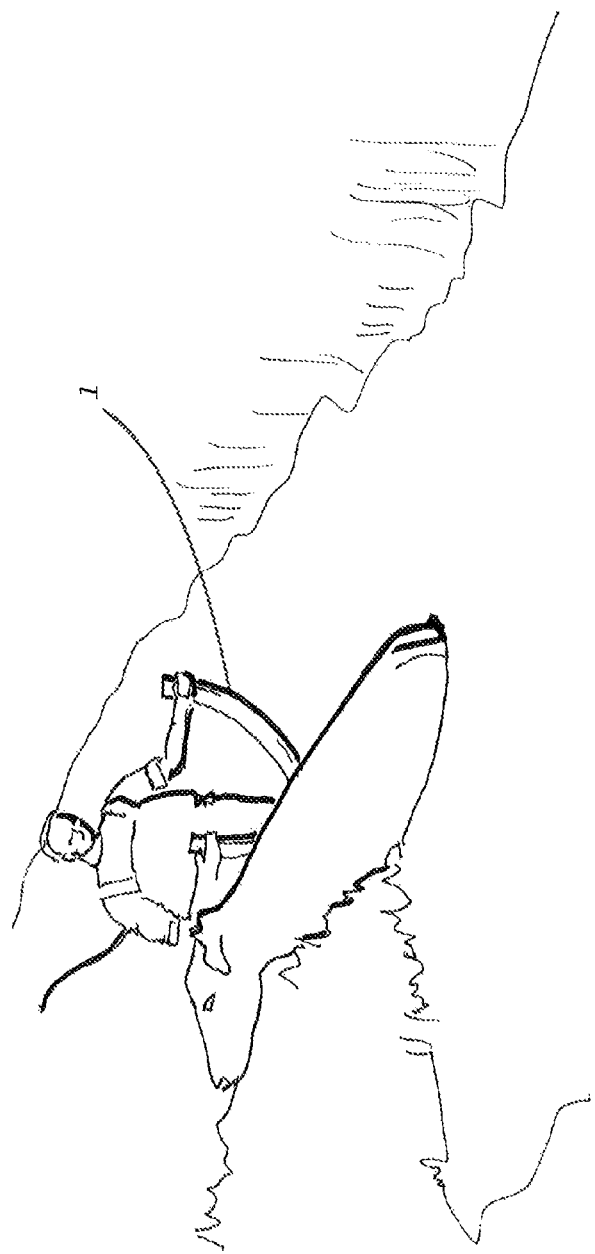

FIG. 3B shows the person standing upright alongside the animal. The person has the rigging 1 in a loose condition.

Figure 3C:

FIG. 3C shows the placement of an abdominal portion 2 of the rigging 1. The abdominal portion 2 is moved underneath the animal along the ventral side. The abdominal portion 2 has two ends which after being inserted are situated on either side of the animal.

Figure 3D:
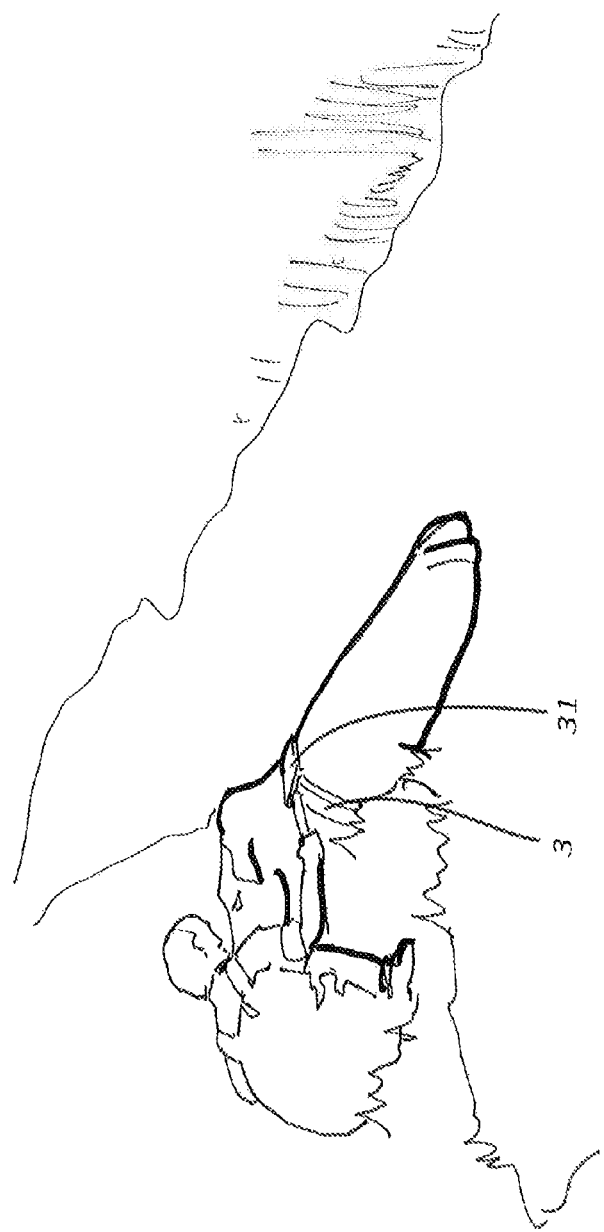

FIG. 3D then shows the closing of the rigging 1. The rigging 1 has a head lock which is positioned in use on the back of the animal. After the head lock is closed, the assemblage of back portion 3 and abdominal portion 2 is located around the body of the animal. Next, the person can pull the rigging 1 tight by pulling on one end of the strap-like back portion 3.

Figure 3E:
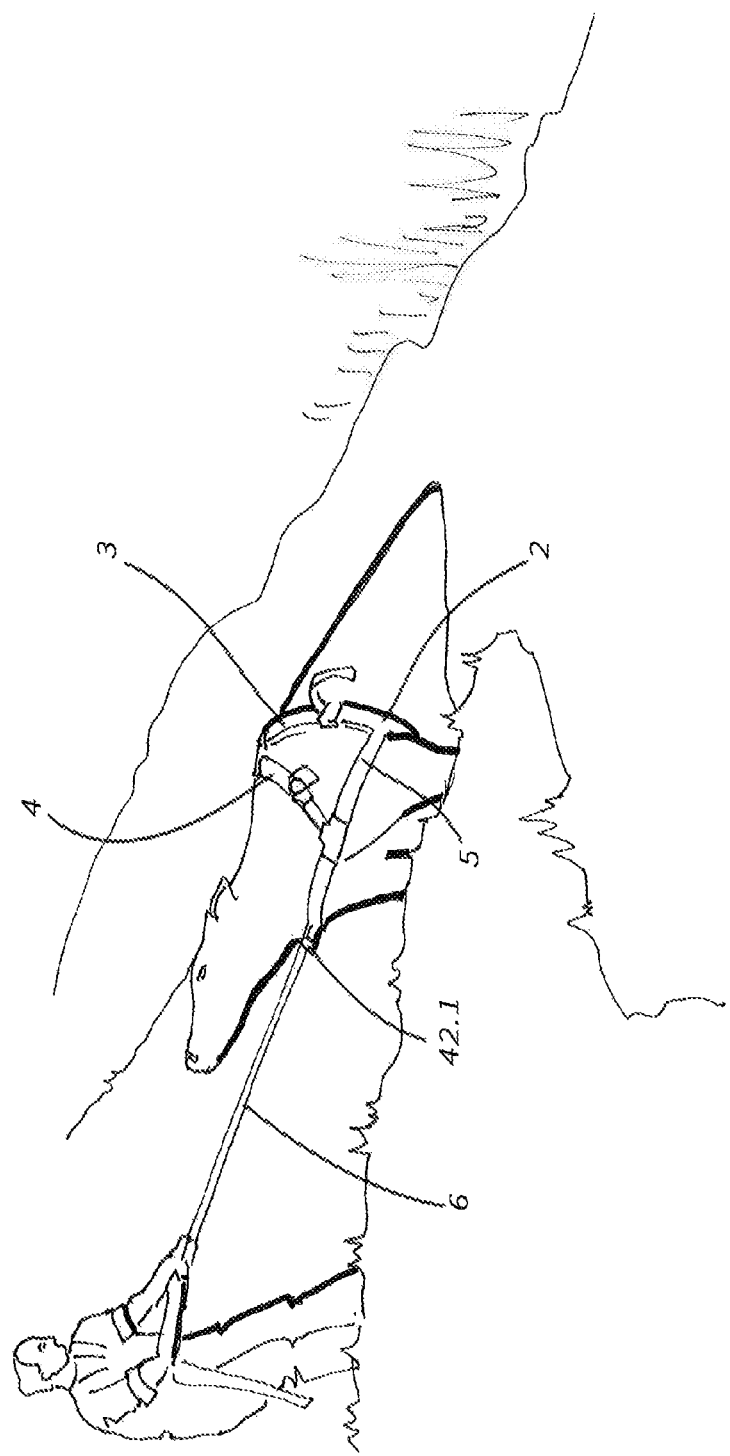

FIG. 3E shows the person at a front side of the animal. Other bands of the rigging 1 forming the neck strap 4 and the pulling straps 5 have been placed. Likewise, a pulling line 6 is coupled to the chest coupling point 42.1 of the rigging 1. Next, a pulling force can be exerted to help the animal get up onto the bank from the ditch. After the animal has been brought onto the bank. the lock on the back of the animal can be released, so that the rigging 1 drops off from it once more.

Many variants are possible in addition to the embodiments shown in the figures.

In one variant of the illustrated embodiment of the rigging, the rigging can be provided with several coupling points for the fastening of several pulling lines or a pulling line in a different position.

In one variant of the illustrated embodiment of the rigging, the rigging is provided with at least one float.

In one variant of the illustrated embodiment of the rigging, the insert element can be a separate item in addition to the abdominal portion and back portion. The insert element can be used as an accessory tool for guiding the abdominal portion along a ventral side of the animal behind at least one foreleg. After putting the rigging in place, the insert element can optionally be removed.

The invention has been disclosed with reference to embodiments of the rigging according to the invention. It is explicitly pointed out that a skilled person after perusal of the specification might want to make changes or adaptations which are possible from a technical standpoint, yet these would not lie outside the scope of protection of the invention as is defined in the accompanying claims. The skilled person should understand that various adaptations can be made and that elements can be replaced by equivalent ones without thereby leaving the essence of the invention. In particular, changes can be made with regard to the embodiments shown within the definition according to the enclosed claims that do not leave the essence of the invention and thus remain within the teaching of the invention. Thus, the invention is not limited to the embodiments as illustrated and described, but rather the scope of protection of the invention will cover all embodiments falling within the definition of the accompanying claims.

LEGEND 1 rigging
2 abdominal portion
3 back portion
4 neck strap
5 pulling strap
6 pulling line
20 insert element
21 first insert element
22 second insert element
210 proximal end of the first insert element
211 distal end of the first insert element
220 proximal end of the second insert element
221 distal end of the second insert element
23 fastening element
31 back portion lock; head lock
41 neck strap lock; head lock
42.1 coupling point to neck strap
42.2 neck coupling point
42.3 side flank coupling point
51 left pulling strap
52 right pulling strap
100 animal
101 head, cranial side
102 ventral side, abdominal side
103 dorsal side, back side
104 chest
105 rear end, caudal side
106 left foreleg
107 right foreleg

The invention claimed is:

1. A rigging for pulling an animal stuck in the water, such as a horse or cow, wherein the rigging comprises:
   at least one elongated abdominal portion which is adapted for placement along a ventral side of the animal behind at least one foreleg of the animal, and
   a back portion which is adapted for placement along a dorsal side of the animal,
   wherein the abdominal portion comprises at least one elongated, bending-stiff insert element, so that the abdominal portion is insertable with an inserting motion behind at least one foreleg of the animal, and
   wherein the at least one insert element has a predetermined arched shape which is adapted to insert the elongated insert element behind a single foreleg or both forelegs.

2. The rigging according to claim 1, wherein the elongated insert element has a length of at least 100 cm.

3. The rigging according to claim 1, wherein the abdominal portion and back portion are integrated with each other into an assemblage, wherein the assemblage has a first end and a second end which is adapted to be joined to each other by means of a back portion lock.

4. The rigging according to claim 3, wherein the back portion lock during use is positioned centrally on the dorsal side of the animal.

5. The rigging according to claim 3, wherein the back portion lock comprises an electronic release with a remote control for the releasing of the back portion lock from a distance.

6. The rigging according to claim 1, wherein the rigging further comprises a neck strap with a neck strap lock, which neck strap is adapted to be placed around a neck of the animal, wherein the neck strap is designed for a coupling by means of the neck strap lock to the assemblage of the abdominal portion and the back portion.

7. The rigging according to claim 6, wherein the neck strap in a lower region has a chest coupling point for the coupling of a pulling line so that the chest coupling point during use is positioned in front of the chest below the head of the animal.

8. The rigging according to claim 6, wherein the rigging moreover comprises at least one pulling strap, which is at least partly positioned or connectable between the assemblage of back portion and abdominal portion and the neck strap, so that a pulling force can be transferred onto both the neck strap and the assemblage.

9. The rigging according to claim 6, wherein the rigging comprises two abdominal portions each with an insert element, which are each to adapted to be arranged behind a foreleg, wherein each insert element has a proximal and a distal end, wherein the proximal ends of the two insert elements are firmly connected to the neck strap and wherein the distal ends are adapted to be coupled to the rigging via the back portion to the neck strap lock.

10. The rigging according to claim 6, wherein the back portion lock for the closing of the assemblage of abdominal portion and back portion and the neck strap lock for the closing of the neck strap are integrated together to form a head lock for the closing or releasing of both the assemblage and the neck strap in a single movement.

11. The rigging according to claim 1, wherein the assemblage of back portion and abdominal portion comprises several fastening elements for the selective fastening of a pulling strap to the assemblage so that the rigging is adjustable in size.

12. A method for the applying of a rigging for pulling an animal, especially an animal stuck in the water, wherein the method involves the following steps:
providing a rigging according to claim 1 in a loosely coupled condition, wherein the elongated insert element of the abdominal portion of the rigging has at least one loosely coupled distal end;
approaching the animal;
inserting the distal end of the insert element behind at least one foreleg; and
coupling the at least one distal end of the abdominal portion to a back portion or neck strap or pulling strap of the rigging.

13. The method according to claim 12, wherein the rigging comprises a single elongated insert element which is inserted in one step of the method behind both forelegs of the animal.

14. The method according to claim 13, wherein the elongated insert element has a first and second loosely coupled end during the inserting, which after the inserting behind the forelegs are joined together on the back of the animal.

15. The method according to claim 12, wherein the rigging comprises two elongated insert elements which are each inserted behind a left and right foreleg of the animal, respectively, in one step.

* * * * *